May 9, 1939. H. JAEGER 2,157,453

PROCESS FOR THE MANUFACTURE OF BEARINGS

Filed Dec. 20, 1937

Inventor:
H. Jaeger

Patented May 9, 1939

2,157,453

UNITED STATES PATENT OFFICE 2,157,453

PROCESS FOR THE MANUFACTURE OF BEARINGS

Hans Jaeger, Karlshorst, Berlin, Germany, assignor to Admos Bleibronze Dr. Springorum & Co. Kom.-Ges., Berlin-Oberschoneweide, Germany Application December 20, 1937, Serial No. 180,882
In Germany January 28, 1937

4 Claims. (Cl. 22—203)

This invention relates to an improved method for the manufacture of bearings and has for its object to produce bearings with linings of a more homogenous character than has been possible in the past.

In the manufacture of bearings for high speed shafts, particularly for aero engines, which consist of a bearing shell of steel lined with an alloy of copper and lead, there are special difficulties in the production of the bearings if they are provided with collars.

When iron mandrels are used in such manufacture, it is known that they must be tapered to a certain extent so that at various places in the blank with a cast lining there are different quantities of the lining material because the thickness of the lining layer varies throughout the axial length of the bearing.

Further, during casting most of the lining metal accumulates in the lower part of the blank and therefore this part remains hot longer than the remainder so that at this point there is the greatest danger of liquation occurring, which must be avoided if a perfect bearing is to be produced.

It has been found that perfect, entirely homogeneous bearings of the kind referred to can be produced, if the free interior of the blank initially is filled completely with the bearing metal, and then the superfluous bearing metal is pressed out by means of a mandrel.

The external diameter of this mandrel is less than the internal diameter of the steel blank to be lined by the thickness of the layer of bearing metal which is to be cast in place and necessarily care must be taken to see that the blank is set in a chill mould, and that the mandrel is introduced as centrally as possible into the mass of alloy which fills up the interior of the steel blank, so that, after the expulsion of the superfluous quantity of metal, an even covering remains on the interior of the blank.

In this method of working the astonishing discovery has been made that the quality of the lining depends materially on the shape of the mandrel at both ends. It has been found that if a mandrel is employed with sharp edges on the surface (lower) which is to be pressed in, eddies occur in the molten metal during the expulsion of the superfluous lining metal, which eddies have a detrimental affect on the quality of the lining.

Further it has been found that also with rounded edges if the radius of the rounding is too great, there is too much lining metal in the lower part of the blank being lined and that therefore liquation occurs in the lining layer, which is decidedly undesirable at this place and is detrimental to quality.

In the drawing two examples of the new means are shown diagrammatically:

The chill mould used is not shown in detail because it is of known kind and obviously is adapted to the shape of the blanks and the lining process.

Figure 1:
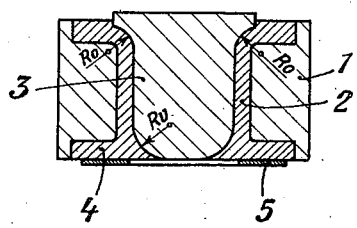
Fig. 1 shows the production of a bearing lined only on the inside, said bearing having comparatively large collars.

In Fig. 1, I is the steel blank, 2 the bearing metal and 3 the mandrel by means of which the surplus bearing metal is expelled from the blank. The radii R$u$ and R$o$ for the rounding of the edges are in a definite ratio to the radius of the collars 4, and 5 are chilling rings which are placed in the mould and covered with sand.

As stated perfect castings are secured if the rounding of the edges of the mandrel bears a definite ratio to the radius of the collar. This ratio for collars of normal dimensions is as follows:

Collar radius : lower mandrel radius (R$u$ Fig. 1)
as 1 : 1÷1.5 and
Collar radius : upper mandrel radius (R$o$ Fig. 1)
as 1 : 1.5÷2

If these proportions are observed, really perfect castings are obtained by the expulsion of the superfluous lining metal from the steel blank.

If the collar is larger than stated above, i. e., abnormal, notwithstanding the observance of the best ratio between the radius of the rounding of the mandrel and the radius of the collar, a perfect lining will not be obtained always if the usual practice is followed; a satisfactory result however can be obtained, also in this case, if chilling rings 5 are placed in the lower side of the sand core in the chill mould.

Fig. 1 of the drawing shows clearly that the greatest quantity of material accumulates at the collars at top and bottom, but undesirable liquation in the alloy is avoided by the correct rounding of the mandrel at these points and by the use of the chilling rings as explained.

Lead bronze must not be brought into contact with untreated iron because when the alloy cools blisters occur at the points where the alloy has been in contact with the untreated iron.

In the present case therefore, the chilling ring 5 is built into the sand base and covered with a layer of sand of about 1 mm thickness which cannot be washed off during casting. The sand layer protects the lead bronze against contact with the iron which, notwithstanding this, induces the desired result of uniform cooling of the bearing metal in the steel blank, so that in this way perfect compound bearings can be produced even with abnormal collars.

As is known, special difficulties arise in the production of compound bearings which have to be provided with bearing metal both inside and outside. It has been found that these difficulties are overcome if, during the casting of the lining of the blank, a simultaneously falling and rising flow of molten metal is employed. This is carried out in practice in such a way that the bearing metal which is poured into the open interior of the steel blank placed in the chill mould rises upwardly from the under side of the interior over the exterior of the blank.

Figure 2:
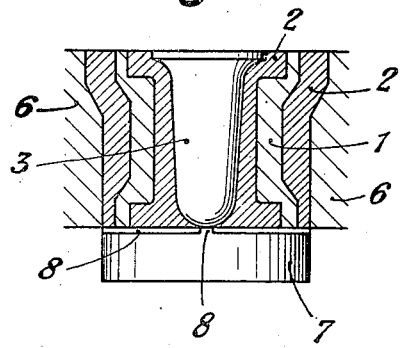
Fig. 2 shows the production of a bearing lined both on the inside and the outside.
Figure 3:
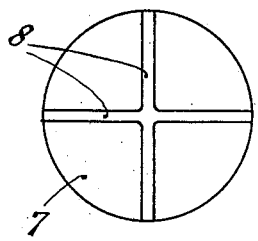
Fig. 3 shows a view of the supporting plate for the mold in plan.
Figure 4:
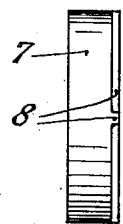
Fig. 4 is a side elevational view thereof.

In Fig. 2 again 1 is the steel blank, 2 the bearing metal on the outer and inner side, 3 is the mandrel and 6 the chill mould. There is also provided a plate 7 having bars 8 on which the mold stands, the movement of the molten metal from the inside to the outside being rendered possible by means of the bars 8.

When a sufficient quantity of lining material has been poured in, the lining material between the interior of the chill mould and the exterior of the blank solidifies to such an extent that, as mentioned above, the mandrel can be inserted into the open interior of the blank and cause the surplus of the lining material to be expelled from the interior in an outward direction.

It has been shown that the best results can be obtained when the total cross-sections of the cast lining material, measured over the entire height of the blank, are approximately identical. In this case cooling takes place so rapidly and evenly that liquation cannot occur, and the bearing metal exhibits a perfect condition on the inside as well as on the outside.

The particularly good effect of the described process of lining, whereby the surplus of the lining alloy is expelled from the interior of the steel blank by means of a mandrel, depends, apart from the consolidation of the bearing metal which occurs during the expulsion, upon the fact that the bronze is cooled off first on the walls of the blank naturally and at the same time, though in very thin layers, solidifies first.

During the expulsion of the still very hot melted mass of metal from the interior of the blank, the solidified layer is again heated to welding temperature, which causes not only a practically perfect and even composition and uniform structure of the bearing alloy throughout its entire mass, but also a very reliable and durable joining of the bearing alloy to the steel blanks.

It appears from the description that the bearing metal in the interior of the steel blank increases in thickness on the walls from top to bottom, whilst it becomes thicker on the outside from bottom to top. This leads to the result already described, namely that the radial thickness of the combined metal layers is the same at all cross-sections of the bearing.

I claim:

1. Improved method for the lining of steel blanks internally and externally with bearing metal for the production of bearings, comprising the arrangement of a steel blank in a chill mould with a space between the interior of the mould and the exterior of the blank with the axis of the blank vertical and with an under passage from the interior to the exterior of the blank, filling the interior of the blank and the space between the exterior of the blank and the interior of the mould with molten metal poured into the interior of the shell and inserting a mandrel to expel the molten metal superfluous to the internal lining through the passage and upwardly along the external surface of the blank.

2. Improved method for the lining of steel blanks internally and externally with bearing metal for the production of bearings, comprising the arrangement of a steel blank in a chill mould with a downwardly tapering space between the interior of the mould and the exterior of the blank with the axis of the blank vertical and with an under passage from the interior to the exterior of the blank, filling the interior of the blank and the downwardly tapering space between the exterior of the blank and the interior of the mould with molten metal poured into the interior of the shell and inserting a downwardly tapering mandrel to expel the molten metal superfluous to the internal lining through the passage and upwardly along the external surface of the blank.

3. Improved method for the lining of steel blanks internally and externally with bearing metal for the production of bearings with abnormal collars comprising the arrangement of a steel blank vertically in a sand based chill mould with a chilling plate embedded in the sand base with a space between the interior of the mould and the exterior of the blank and with an under passage from the interior to the exterior of the blank, filling the interior of the blank and the space between the exterior of the blank and the interior of the mould with molten metal poured into the interior of the shell and inserting a mandrel to expel the molten metal superfluous to the internal lining through the passage and upwardly along the external surface of the blank.

4. Improved method for the lining of steel blanks internally and externally with bearing metal for the production of bearings with abnormal collars comprising the arrangement of a steel blank vertically in a sand based chill mould with a chilling plate embedded in the sand base with a downwardly tapering space between the interior of the mould and the exterior of the blank and with an under passage from the interior to the exterior of the blank, filling the interior of the blank and the downwardly tapering space between the exterior of the blank and the interior of the mould with molten metal poured into the interior of the shell and inserting a downwardly tapering mandrel to expel the molten metal superfluous to the internal lining through the passage and upwardly along the external surface of the blank.

HANS JAEGER.